United States Patent
Wong

(10) Patent No.: US 9,146,957 B2
(45) Date of Patent: Sep. 29, 2015

(54) METHOD AND SYSTEM FOR GENERATING OPTIMAL MEMBERSHIP-CHECK QUERIES

(71) Applicant: Joseph Wong, Vancouver (CA)

(72) Inventor: Joseph Wong, Vancouver (CA)

(73) Assignee: Business Objects Software Ltd., Dublin (IE)

( * ) Notice: Subject to any disclaimer, the term of this patent is extended or adjusted under 35 U.S.C. 154(b) by 371 days.

(21) Appl. No.: 13/721,601

(22) Filed: Dec. 20, 2012

(65) Prior Publication Data

US 2014/0181073 A1 Jun. 26, 2014

(51) Int. Cl.
G06F 17/30 (2006.01)

(52) U.S. Cl.
CPC .... *G06F 17/30466* (2013.01); *G06F 17/30436* (2013.01)

(58) Field of Classification Search
CPC .............. G06F 17/30466; G06F 17/30436
See application file for complete search history.

(56) References Cited

U.S. PATENT DOCUMENTS

| | | | | |
|---|---|---|---|---|
| 5,701,454 A * | 12/1997 | Bhargava et al. | ............ | 1/1 |
| 5,774,692 A * | 6/1998 | Boyer et al. | ............ | 1/1 |
| 6,748,377 B1 * | 6/2004 | Attaluri | ............ | 1/1 |
| 7,895,189 B2 | 2/2011 | Balmin et al. | | |
| 2003/0126136 A1* | 7/2003 | Omoigui | ............ | 707/10 |
| 2004/0015487 A1* | 1/2004 | Lin et al. | ............ | 707/3 |
| 2004/0019587 A1* | 1/2004 | Fuh et al. | ............ | 707/2 |
| 2005/0086208 A1* | 4/2005 | Bestgen et al. | ............ | 707/3 |
| 2005/0262048 A1* | 11/2005 | Dettinger et al. | ............ | 707/3 |
| 2006/0167865 A1* | 7/2006 | Andrei | ............ | 707/4 |
| 2008/0065674 A1* | 3/2008 | Liu et al. | ............ | 707/102 |
| 2008/0262999 A1* | 10/2008 | Helsen et al. | ............ | 707/2 |
| 2008/0319957 A1* | 12/2008 | Muralidhar et al. | ............ | 707/4 |
| 2009/0240675 A1* | 9/2009 | Asai et al. | ............ | 707/4 |
| 2010/0030896 A1* | 2/2010 | Chandramouli et al. | ..... | 709/224 |
| 2010/0036803 A1* | 2/2010 | Vemuri et al. | ............ | 707/2 |
| 2010/0241629 A1* | 9/2010 | Tatemura et al. | ............ | 707/741 |
| 2011/0035398 A1* | 2/2011 | Lee et al. | ............ | 707/760 |
| 2012/0124063 A1* | 5/2012 | Wong | ............ | 707/754 |
| 2012/0323885 A1* | 12/2012 | Wang et al. | ............ | 707/714 |
| 2013/0086039 A1 | 4/2013 | Salch et al. | | |

(Continued)

OTHER PUBLICATIONS

"MYSQL 5.0 Reference Manual: 8.3.1 Outer Join Simplification", © 2012, Oracle Corporation and/or its affiliates, [Online]. Retrieved from the Internet: <URL: http://dev.mysql.com/doc/refman/5.0/en/outer-join-simplification.html>, (Accessed Dec. 21, 2012), 4 pgs.

(Continued)

*Primary Examiner* — Tarek Chbouki
(74) *Attorney, Agent, or Firm* — Schwegman Lundberg & Woessner, P.A.

(57) ABSTRACT

A method and system of transforming a query at a web server are provided. An abstract syntax tree representing the query can be traversed from the top down, for each node in the abstract syntax tree: labeling the node as being in a conjunct position when the node's parent is a WHERE node; labeling the node as being not in a conjunct position when the node's parent is an OR node; and labeling the node identically to the node's parent node when the node's parent is an AND node. Then any IN node in the abstract syntax tree can be transformed to an INNER JOIN node when the IN node is labeled as being in a conjunct position. The abstract syntax tree can be converted into a Structured Query Language (SQL) query, which can then be passed to a database for processing.

13 Claims, 19 Drawing Sheets

(56) References Cited

U.S. PATENT DOCUMENTS

2014/0181072 A1 6/2014 Wong
2014/0188841 A1 7/2014 Sun et al.

OTHER PUBLICATIONS

"U.S. Appl. No. 13/721,433, Examiner Interview Summary mailed Nov. 12, 2014", 3 pgs.

"U.S. Appl. No. 13/721,433, Final Office Action mailed Jan. 23, 2015", 25 pgs.

"U.S. Appl. No. 13/721,433, Non Final Office Action mailed Aug. 14, 2014", 25 pgs.

"U.S. Appl. No. 13/721,433, Notice of Allowance mailed Apr. 6, 2015", 12 pgs.

"U.S. Appl. No. 13/721,433, Response filed Mar. 5, 2015 to Final Office Action mailed Jan. 23, 2015", 11 pgs.

"U.S. Appl. No. 13/721,433, Response Filed Nov. 14, 2014 to Non Final Office Action mailed Aug. 14, 2014", 17 pgs.

"Join (SQL)", [Online]. Retrieved from the Internet: <URL: http://en.wikipedia.org/w/index.php?oldid=529944245>, (Accessed Dec. 31, 2012), 16 pgs.

"Select (SQL)", [Online]. Retrieved from the Internet: <URL: http://en.wikipedia.org/w/index.php?oldid=529942828>, (Accessed Dec. 31, 2012), 6 pgs.

Chamberlin, Donald D, et al., "SQL", [Online]. Retrieved from the Internet: <URL: http://en.wikipedia.org/w/index.php?oldid=523499964 >, (Accessed Nov. 20, 2012), 16 pgs.

Factor, Phil, "Temporary Tables in SQL Server", [Online]. Retrieved from the Internet: <URL: http://www.simple-talk.com/content/print.aspx?article=1349>, (Sep. 1, 2011), 7 pgs.

Jones, Joel, "Abstract Syntax Tree Implementation Idioms", Proceedings of the 10th Conference on Pattern Languages of Programs PLoP2003 (2003), [Online]. Retrieved from the Internet: <URL: http://web.archive.org/web/20120406111308/http:/www.hillside.net/plop/plop2003/Papers/Jones-ImplementingASTs.pdf>, (2003), 10 pgs.

Kliebhan, Fabian, "A Truly Compositional SQL Compiler", (Sep. 4, 2009), 28 pgs.

\* cited by examiner

METHOD AND SYSTEM FOR GENERATING OPTIMAL MEMBERSHIP-CHECK QUERIES

TECHNICAL FIELD

This document generally relates to systems and methods for use with databases. More specifically, this document relates to methods and systems for generating optimal membership-check queries.

BACKGROUND

Relational databases often receive queries in the form of Structured Query Language (SQL), or other structured format. One type of command that can be present in a SQL query is an outer join command. In an outer join command, two tables are combined without a requirement that the two tables have matching records. The resultant combined table contains all records of a first table and all records of the second table, with null in the places in the records of the second table that have no matching record in the first table. A left outer join identifies a left table as the first table and a right table as the second table, and thus the result of a left outer join contains all records of the left table even if the join condition finds no matching record in the right table. Such left outer join commands are utilized in a number of different queries, however in some cases they are inefficient to process.

An inner join is a common join operation. An inner join creates a new result table by combining column values from a first table and a second table based upon a join-predicate. A comparison is made of each row of the first table with each row of the second table to find all pairs of rows which satisfy the join-predicate. When the join-predicate is satisfied, column values for each matched pair of rows of the first table and the second table are combined into a result row.

An IN operation allows for the specification of multiple values, any one of which, if present, would satisfy the IN operation. In this manner, it is similar to providing multiple OR operations.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a database query is optimized by replacing certain instances of left outer join commands with inner join commands. This allows for optimization strategies to be utilized within the database upon receipt of the modified database query. One such example optimization includes inverting a loop so that a right-hand side is evaluated first and used as an outer loop for a join, which can be especially helpful if the cardinality of the right-hand side is much smaller than the cardinality of the left-hand side. This optimization can be performed prior to the query being delivered to the database for processing, allowing for an optimized query regardless of the exact type of database utilized (e.g., the solution is database-agnostic).

Figure 1:
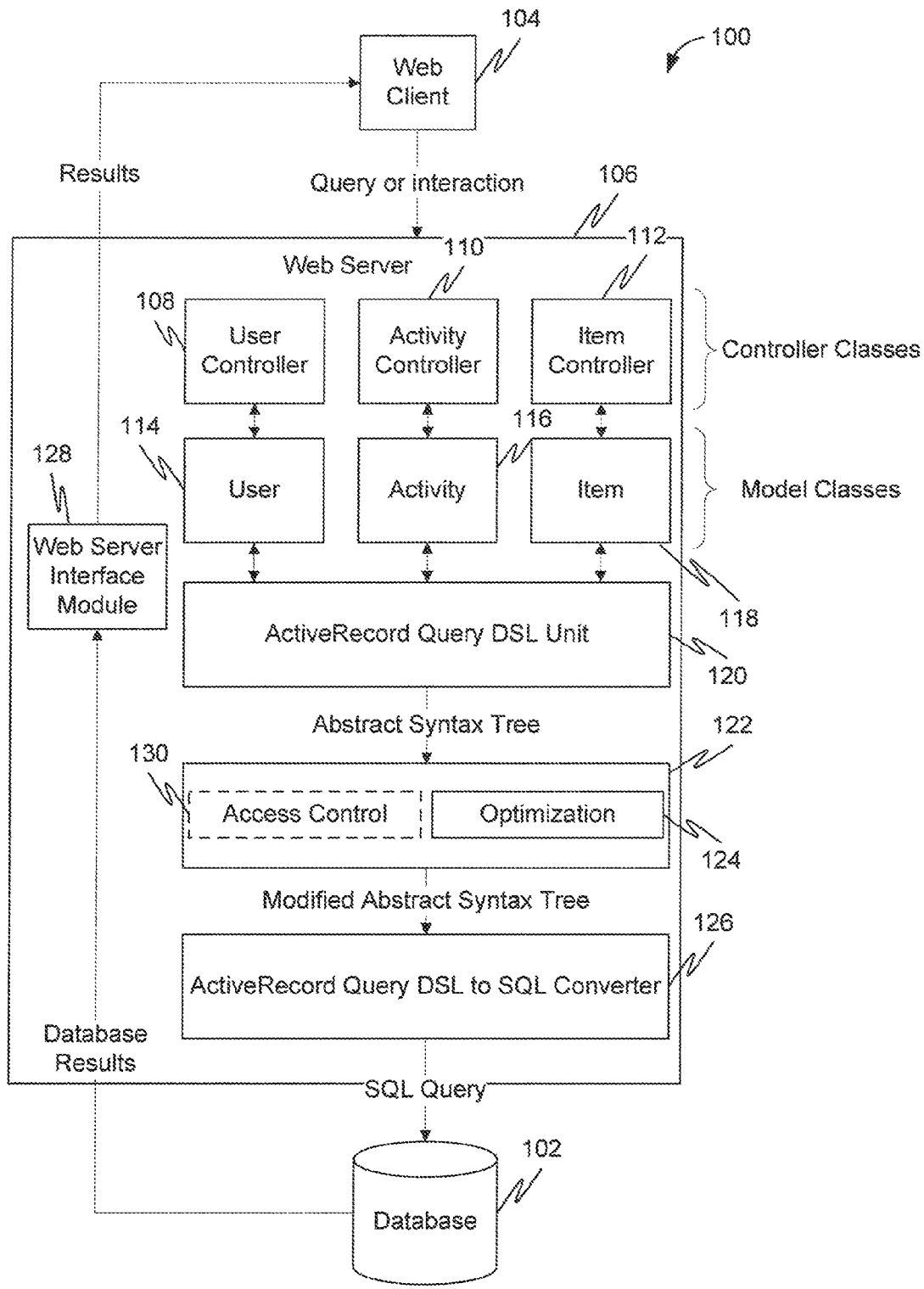
FIG. 1 is a diagram illustrating a system, in accordance with an example embodiment, to perform query optimization outside of a database.

FIG. 1 is a diagram illustrating a system 100, in accordance with an example embodiment, to perform query optimization outside of a database. The system 100 may include a database 102, which may be a relational database designed to accept queries in the form of SQL commands (or other types of structured query commands). The system 100 may also include a web client 104, such as a browser web page, which acts to communicate with a web server 106. In some example embodiments, the web server 106 may be a light server, such as a light Java server.

In this example embodiment, the web client 104 interacts with the web server 106 to generate a query. This query may take many forms. Since the web client 104 may be designed to operate specifically with the web server 106, the query may be formulated using a proprietary language. Indeed, it is even possible that the query not be a formalized query as one would traditionally think of it, but rather could simply be an instruction to retrieve or examine certain data, which the web server 106 could then interpret as a database query. It is also possible that the query be in the form of a database language, such as SQL. In such cases, as will be seen later, the web server 106 may additionally contain a mechanism to convert the database language to a usable form.

In the example embodiment of FIG. 1, the web server 106 may contain a series of controller classes, including a user controller class 108, an activity controller class 110, and an item controller class 112. The web server 106 may then additionally contain a series of model classes, including a user class 114, an activity class 116, and an item class 118. A user at the web browser 104 directs interaction with a view of an application presented within the browser. The browser interacts with these classes 108-118 to define a query. For example, a request for data is handled by one of the controller classes 108-112 to define a query. These classes 108-118 are used in conjunction with an ActiveRecord query domain specific language (DSL) unit 120 to convert the query from the web client 104 into an ActiveRecord query domain specific language. This may include converting the query into an abstract syntax tree (or at least refining a received abstract syntax tree to match the syntax of the ActiveRecord query domain specific language).

The abstract syntax tree is then passed to a block 122 that includes an optimization unit 124. The optimization unit 124 acts to convert appropriate left outer join operations to inner join operations. The details of how this is accomplished are described later in this disclosure. The result of this optimization, however, is that the query has essentially been "simplified" in a way that the database 102 can perform one or more various optimizations that speed the execution of the resulting query.

The output of the optimization unit 124 may be a modified abstract syntax tree, which may be passed to an ActiveRecord Query DSL to SQL converter 126. The ActiveRecord Query DSL to SQL converter 126 may then convert the modified abstract syntax tree to SQL, allowing it to be executed by the database 102. The database 102 may then pass the query results to a web server interface module 128, which can then present the results to the web client 104. In some example embodiments the results are returned to or through other elements of system 100, such as, through controller classes 108-112 to the web browser 104.

Also depicted in FIG. 1 is an access control unit 130. While the example embodiment depicted here is non-limiting in general, even within this example embodiment the access control unit 130 is optional. The access control unit 130 acts to provide access control by joining a dataset with an access control list (ACL) table. The resulting left outer join operation is one of many different types of left outer join operations that can then be optimized by the optimization unit 124. The access control unit 130 is presented in this example embodiment as an example of how such a left outer join operation could easily be encountered, and the disclosure is not intended to be limited in applicability to left outer join operations created by an access control unit 130. The access control unit 130 is also presented in this example embodiment because in some embodiments both the access control unit 130 and the optimization unit 124 are part of the same block 122. This allows the access control procedures (e.g., generating left outer join operations) to be performed during the same abstract syntax tree traversal as the optimization procedures (e.g., replacing some left outer join operations with inner join operations).

Figure 2:
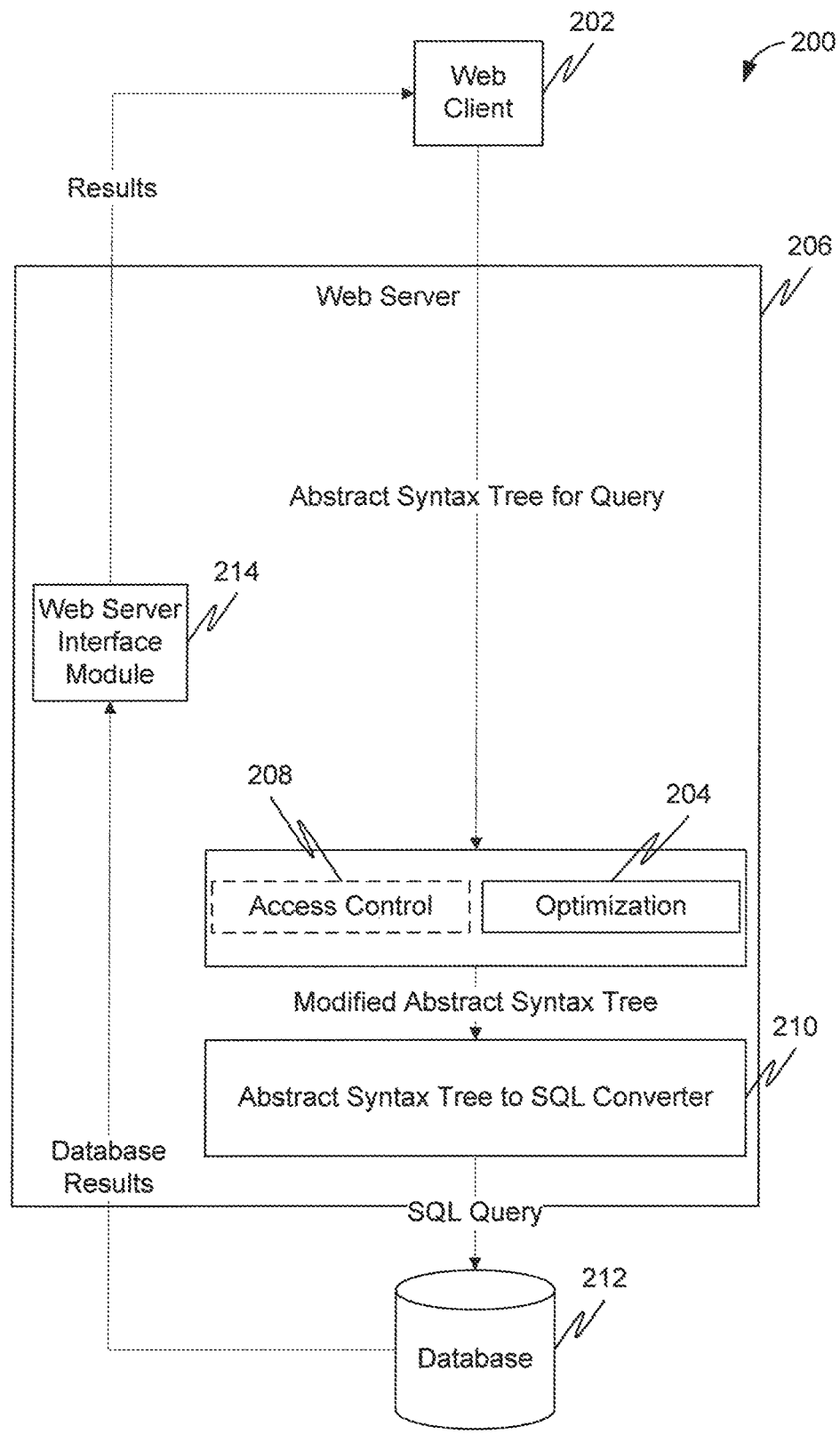
FIG. 2 is a diagram illustrating a system, in accordance with another example embodiment, to perform query optimization outside of a database.

FIG. 2 is a diagram illustrating a system, in accordance with another example embodiment, to perform query optimization outside of a database. This system 200 is similar to the system 100 in FIG. 1, except that the web client 202 generates a query as an abstract syntax tree. As such, there is no need for an ActiveRecord Query DSL unit 120 to convert the query into an abstract syntax tree. The abstract syntax tree may be passed directly to an optimization unit 204 in the web server 206 (or first passed through the optional access control unit 208). The optimized abstract syntax tree may then be passed to an abstract syntax tree to SQL converter 210, which converts the modified abstract syntax tree to SQL, allowing it to be executed by the database 212. The database 212 may then pass the query results to a web server interface module 214, which can then present the results to the web client 202.

Figure 3:
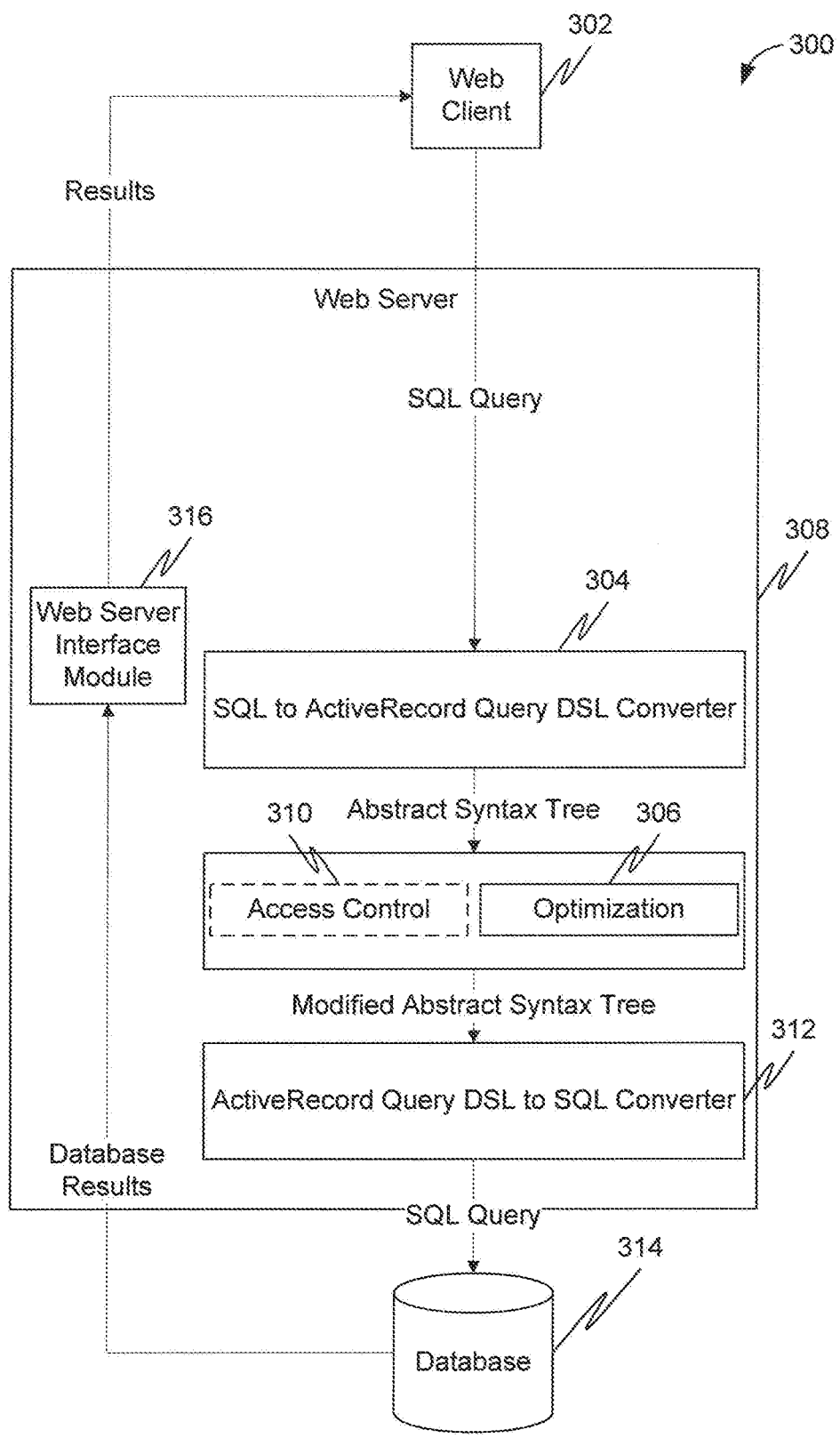
FIG. 3 is a diagram illustrating a system, in accordance with another example embodiment, to perform query optimization outside of a database.

FIG. 3 is a diagram illustrating a system, in accordance with another example embodiment, to perform query optimization outside of a database. This system 300 is also similar to the system 100 in FIG. 1, except that the web client 302 generates a query as a SQL query. A SQL to ActiveRecord Query DSL converter 304 then acts to convert the incoming SQL query to an abstract syntax tree. The abstract syntax tree may then be passed directly to an optimization unit 306 in the web server 308 (or first passed through the optional access control unit 310). The optimized abstract syntax tree may then be passed to an abstract syntax tree to SQL converter 312, which converts the modified abstract syntax tree back to SQL, allowing it to be executed by the database 314. The database 314 may then pass the query results to a web server interface module 316, which can then present the results to the web client 302.

As described earlier, the abstract syntax tree is optimized by replacing appropriate left outer join operations with inner join operations. It should be noted that the term "replacing" is used loosely in this disclosure so as to be broad enough to cover the concept of electing not to generate a left outer join node in the first place in favor of generating an inner join node, in instances where a left outer join node would ordinarily have been generated. In an example embodiment, an "IN" expression involving a subquery is transformed to a combination of a join expression and Boolean expression replacing the "IN" expression. The join expression is selected to be either a LEFT OUTER JOIN operation or an INNER JOIN operation based upon a conjunct position analysis, which may be performed using the abstract syntax tree, traversing from top to bottom.

By definition, a node underneath a WHERE node is evaluated as being in a conjunct position (e.g., in_conjunct_position=TRUE). In each pass, all nodes in the next level of the subtree are labeled as follows. If the node's parent is an OR node, then the node is labeled as not being in a conjunct position (e.g., in_conjunct_position=FALSE). If the node's parent is an AND node, the parent node's conjunct position status is copied to this node. If the node's parent is neither an OR nor an AND, then the node is labeled as being in neither conjunct position or not a conjunct position (e.g., the label is left blank, in_conjunct_position=NULL). Traversal may be stopped when the previous pass labels all nodes as blank.

The transformation may use an INNER JOIN if the IN node is labeled as being in a conjunct position (e.g., in_conjunct_position=TRUE). Otherwise, the transformation uses a LEFT OUTER JOIN.

FIGS. 4A-4E illustrate abstract syntax trees in accordance with an example embodiment. In this example embodiment, the following schemas may be utilized. An EP table may include fields for id, region, and firm. An ACL table may include fields for sharer_ep_id, and recip_ep_id. Notably, the inclusion of the ACL table implies that an access control unit is utilized to generate LEFT OUTER JOINS (or at least start the process towards the generating of the LEFT OUTER JOINS, if the access control aspects are performed in the same pass as the optimization aspects).

The input statement for this example embodiment, presented in SQL form, may be:

```
SELECT *
FROM EP
WHERE (EP.firm = 'SAP AG' OR
    EP.id IN (SELECT sharer_ep_id FROM ACL WHERE
```

```
      recip_ep_id = 7))
    AND EP.region = 'Midwest'
```

Figure 4A:
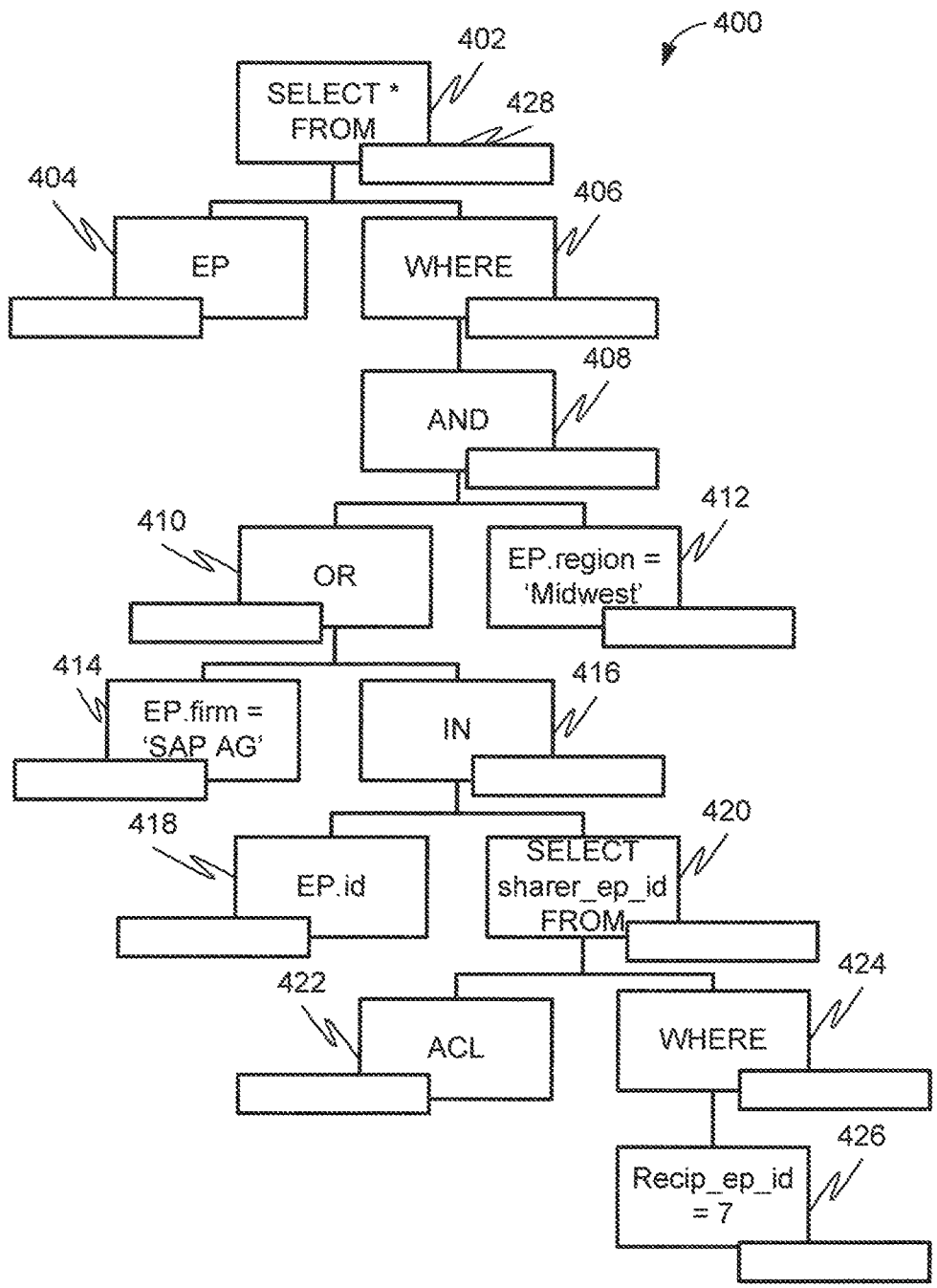
FIGS. 4A-4E illustrate abstract syntax trees in accordance with an example embodiment.

FIG. 4A illustrates an abstract syntax tree, in accordance with an example embodiment, formed from an input statement. The abstract syntax tree 400 includes a series of nodes 402-426. Each node 402-426 includes a construct of the syntax, representing a "value" of a node. For example, node 420 has a "value" of "SELECT * FROM". Each node also has a field representing a flag for in_conjunct_position, depicted as 428 of node 402 but present in each node. These fields are depicted as being initially null in FIG. 4.

Figure 4B:
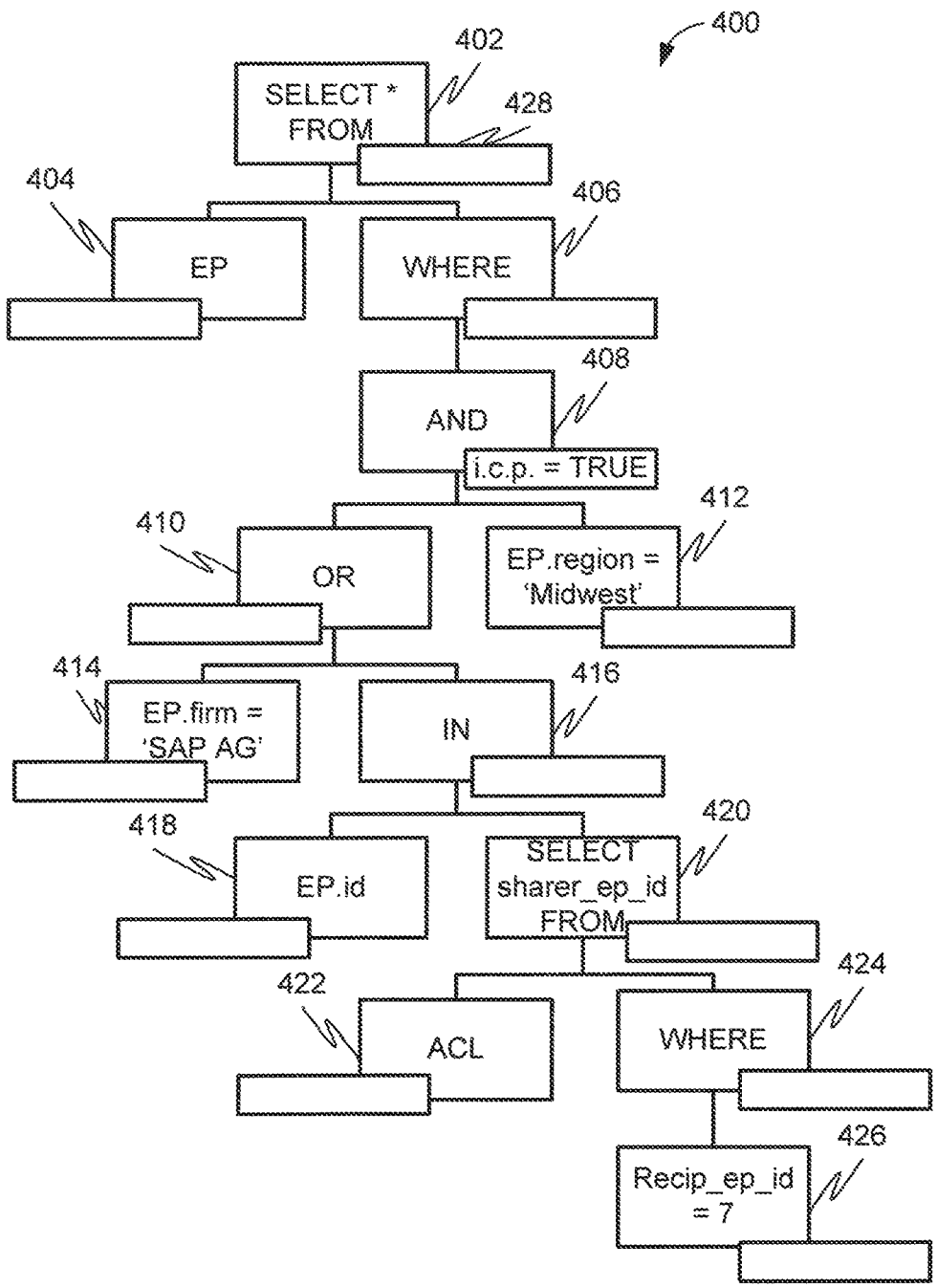

FIG. 4B illustrates the abstract syntax tree, in accordance with an example embodiment, after a first level has been labeled. Here, the AND node 408 has been labeled as being in a conjunct position because its parent node is a WHERE node 406. It should be noted that while this figure is described as depicting the abstract syntax tree after a first level has been labeled, the process may have actually still begun with the top node 402, stepping through each level until a level needs to be labeled.

Figure 4C:
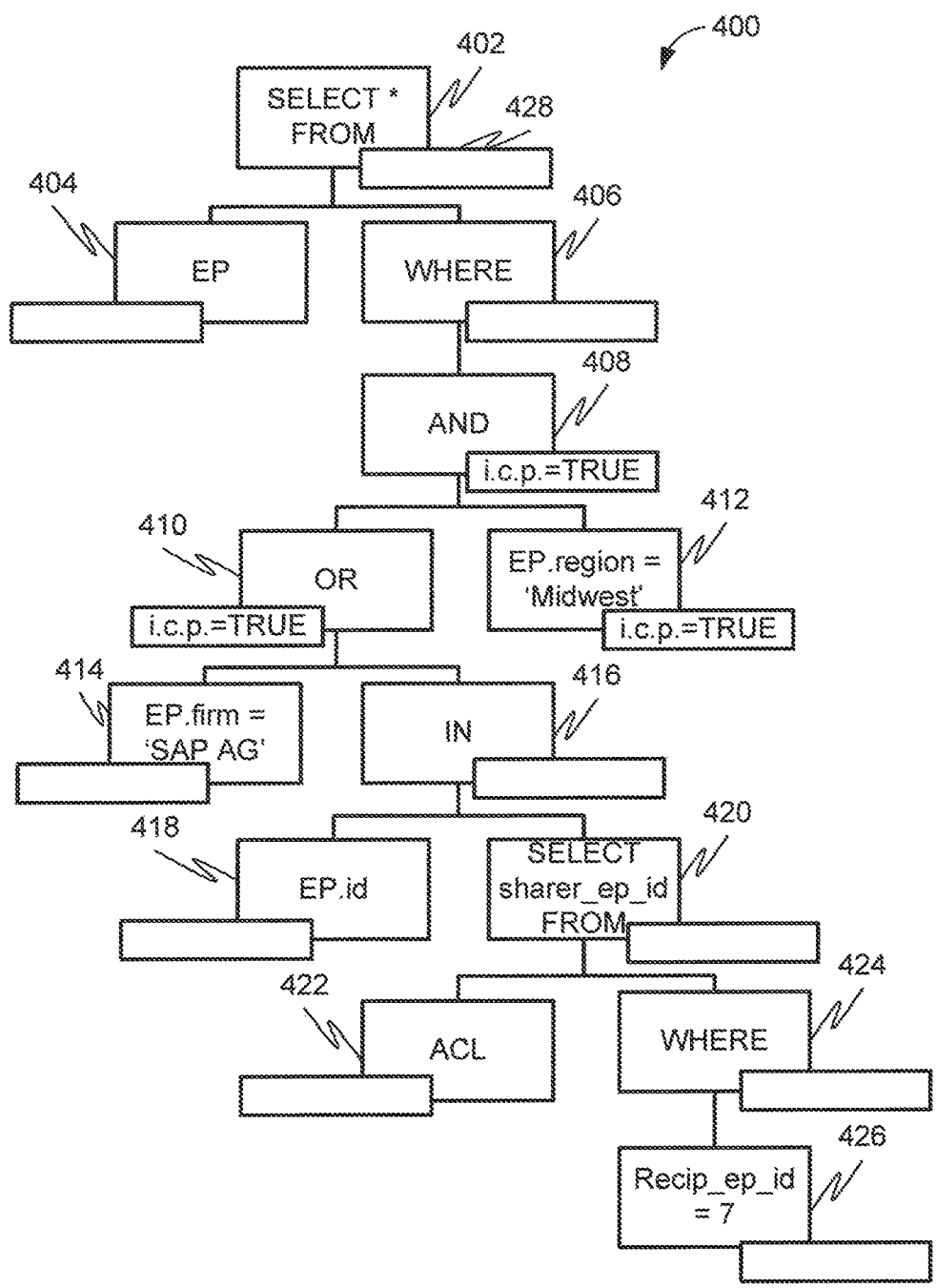

FIG. 4C illustrates the abstract syntax tree, in accordance with an example embodiment, after a second level has been labeled. Here, both OR node 410 and EP.region='Midwest' node 412 are labeled as being in conjunct positions because their parent node is an AND node 408.

Figure 4D:
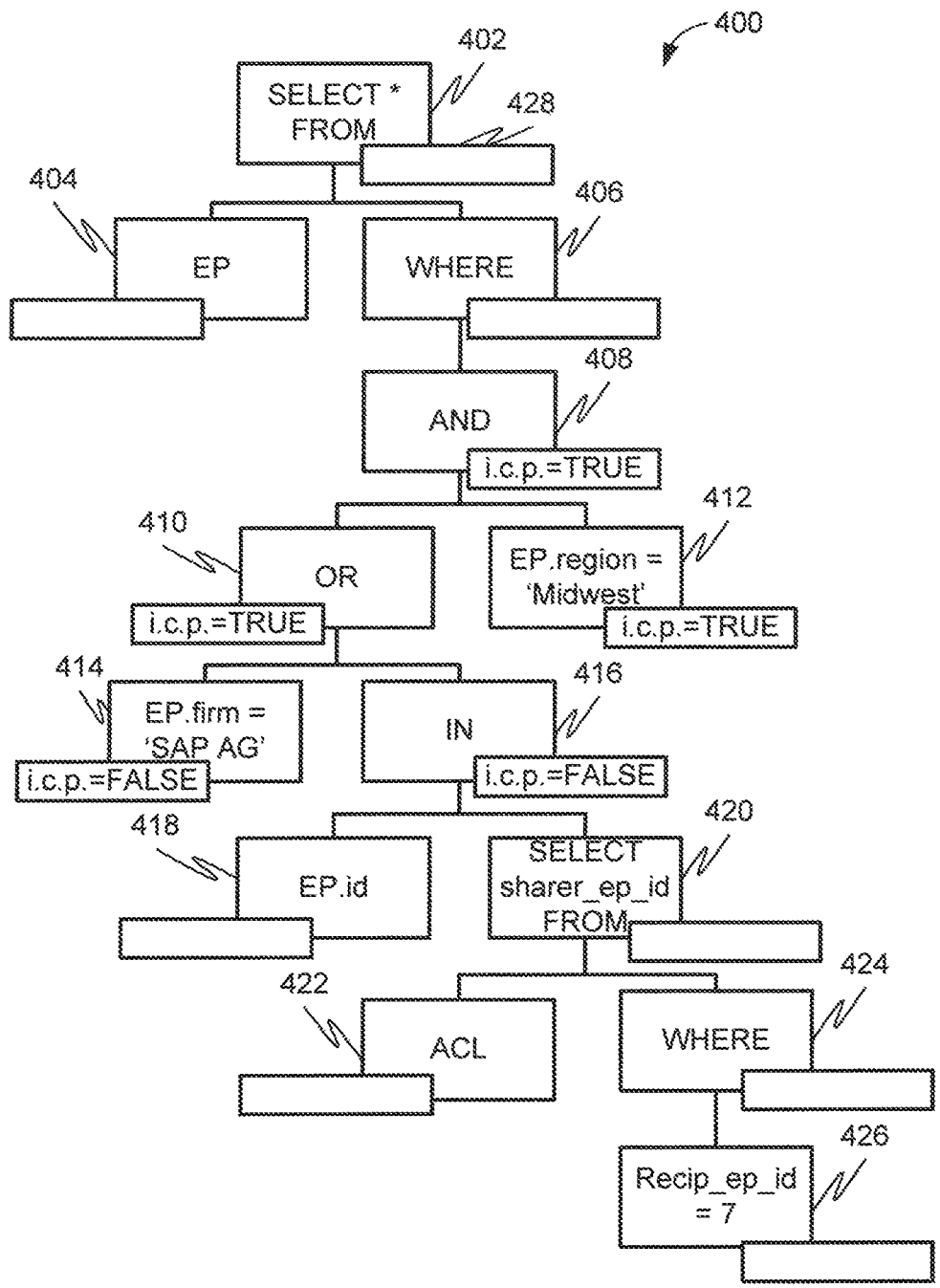

FIG. 4D illustrates the abstract syntax tree, in accordance with an example embodiment, after a third level has been labeled. Here, both EP.firm='SAP AG' node 414 and IN node 416 are labeled as not being in conjunct positions because their parent node is an OR node 410. All remaining nodes 418-426 are unlabeled because their respective parent nodes are neither OR nor AND nodes.

Figure 4E:
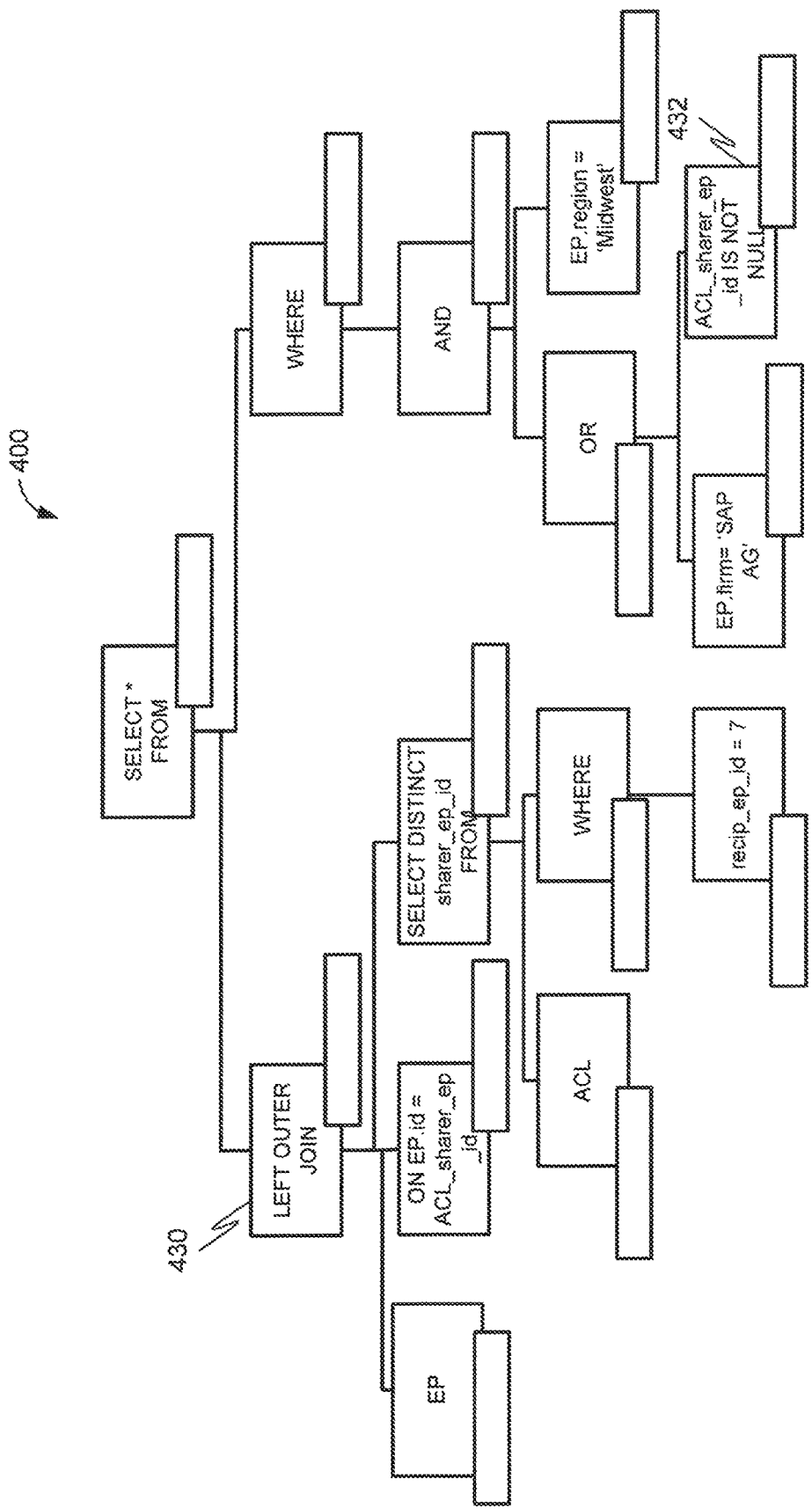

At this point, any IN node is transformed to a join node. The type of join node is dependent on whether the IN node is in a conjunct position or not. In this example, the IN node 416 is shown as not being in a conjunct position. As such, a plain left outer join is used (e.g., no optimization). FIG. 4E illustrates a modified syntax tree, in accordance with an example embodiment. As can be seen, LEFT OUTER JOIN node 430 has been added, as well as an ACL.sharer_ep_id is NOT NULL node 432 and the abstract tree 400 has been rearranged.

The modified syntax tree 400 can then be converted into SQL. The resultant SQL query may represented as:

```
SELECT *
FROM EP LEFT OUTER JOIN
    (SELECT DISTINCT sharer_ep_id FROM ACL WHERE
    recip_ep_id = 7) ON EP.id = ACL.sharer_ep_id
WHERE (EP.firm ='SAP AG' OR
        ACL.sharer_ep_id IS NOT NULL) AND
        EP.region = 'Midwest'
```

FIGS. 5A-5E illustrate abstract syntax trees in accordance with another example embodiment. This example embodiment is similar to the one presented in FIGS. 4A-4E, except that the input statement for this example embodiment, presented in SQL form, may be:

```
    SELECT *
    FROM EP
    WHERE (EP.firm = 'SAP AG' AND
        EP.id IN (SELECT sharer_ep_id FROM ACL WHERE
```

```
      recip_ep_id = 7))
    AND EP.region = 'Midwest'
```

Figure 5A:
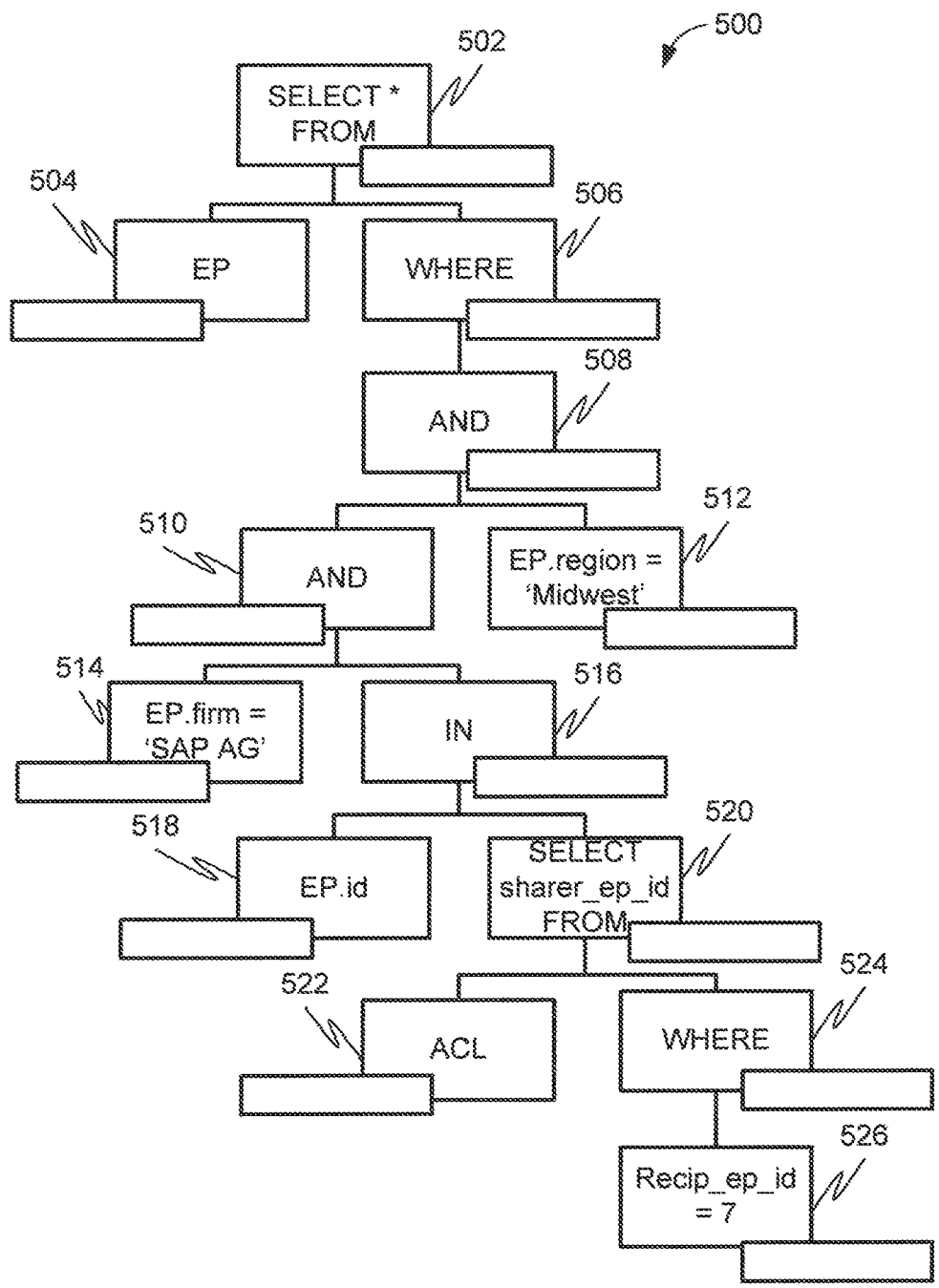
FIGS. 5A-5E illustrate abstract syntax trees in accordance with another example embodiment.

FIG. 5A illustrates an abstract syntax tree, in accordance with an example embodiment, formed from an input statement. The abstract syntax tree 500 includes a series of nodes 502-526. As with FIG. 4, each node 502-526 includes a "value" of a node and a field representing a flag for in_conjunct_position. These fields are depicted as being initially null in FIG. 5.

Figure 5B:
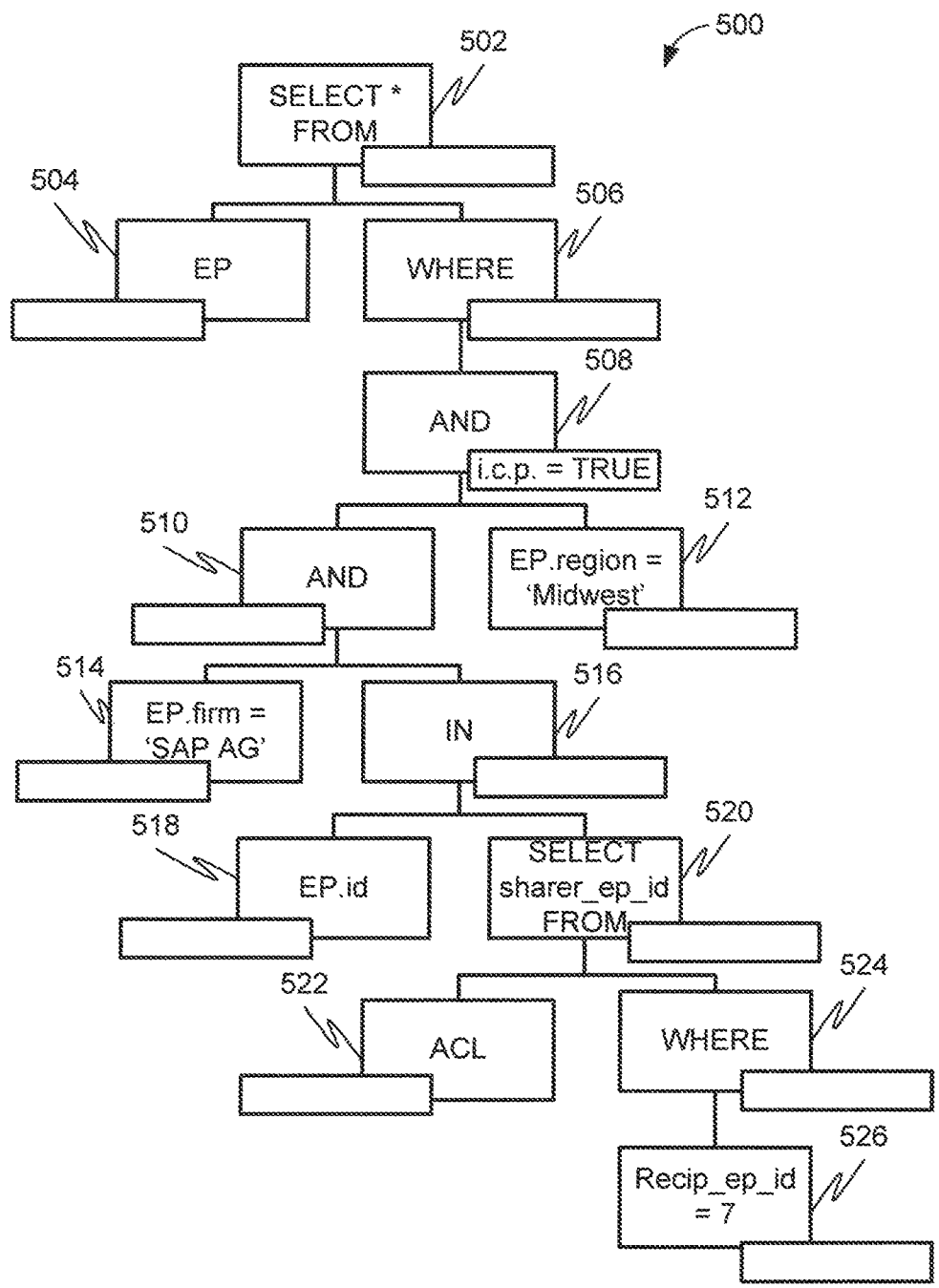

FIG. 5B illustrates the abstract syntax tree, in accordance with an example embodiment, after a first level has been labeled. Here, the AND node 508 has been labeled as being in a conjunct position because its parent node is a WHERE node 506.

Figure 5C:
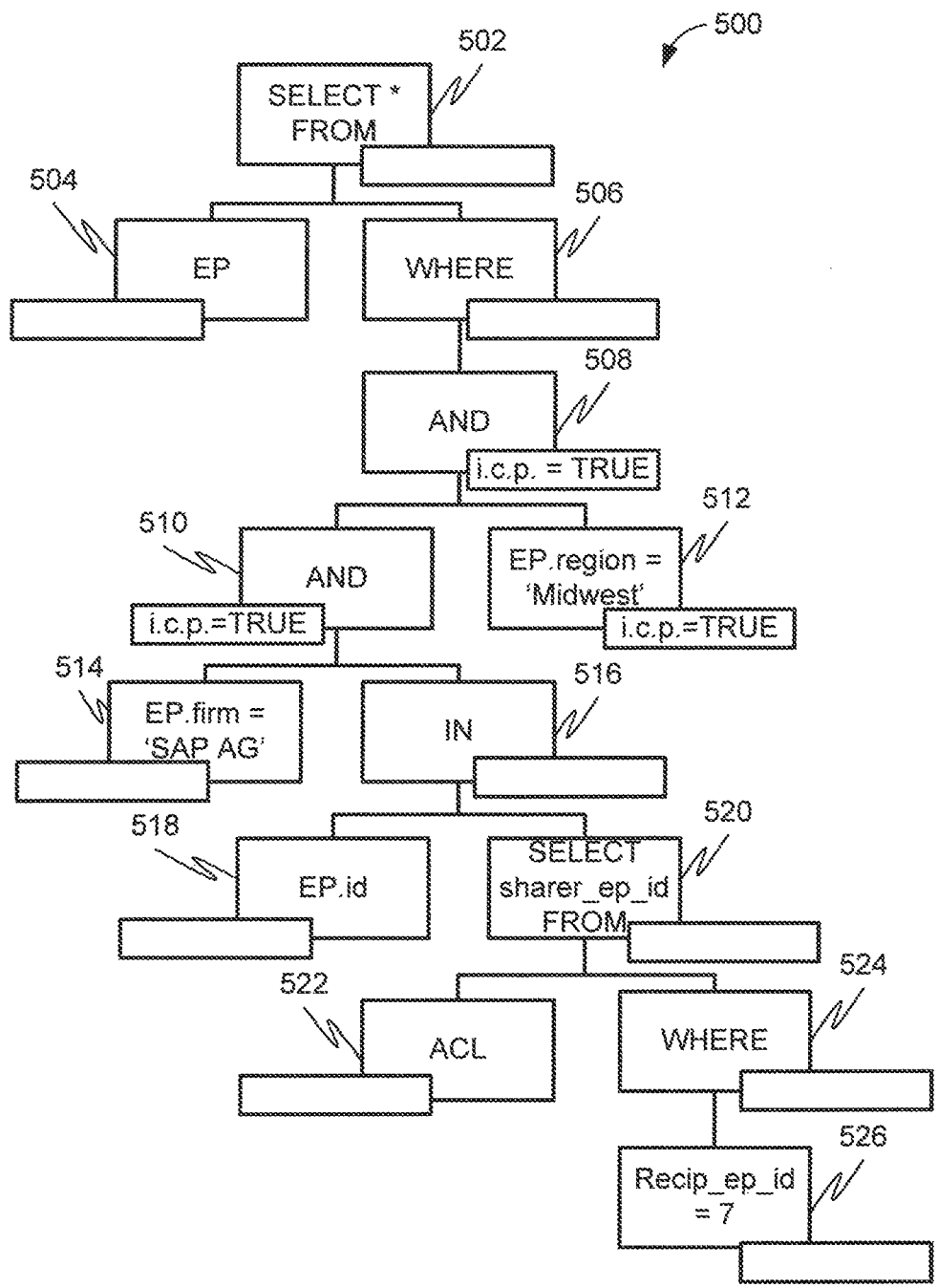

FIG. 5C illustrates the abstract syntax tree, in accordance with an example embodiment, after a second level has been labeled. Here, both AND node 510 and EP.region='Midwest' node 512 are labeled as being in conjunct positions because their parent node is an AND node 508.

Figure 5D:
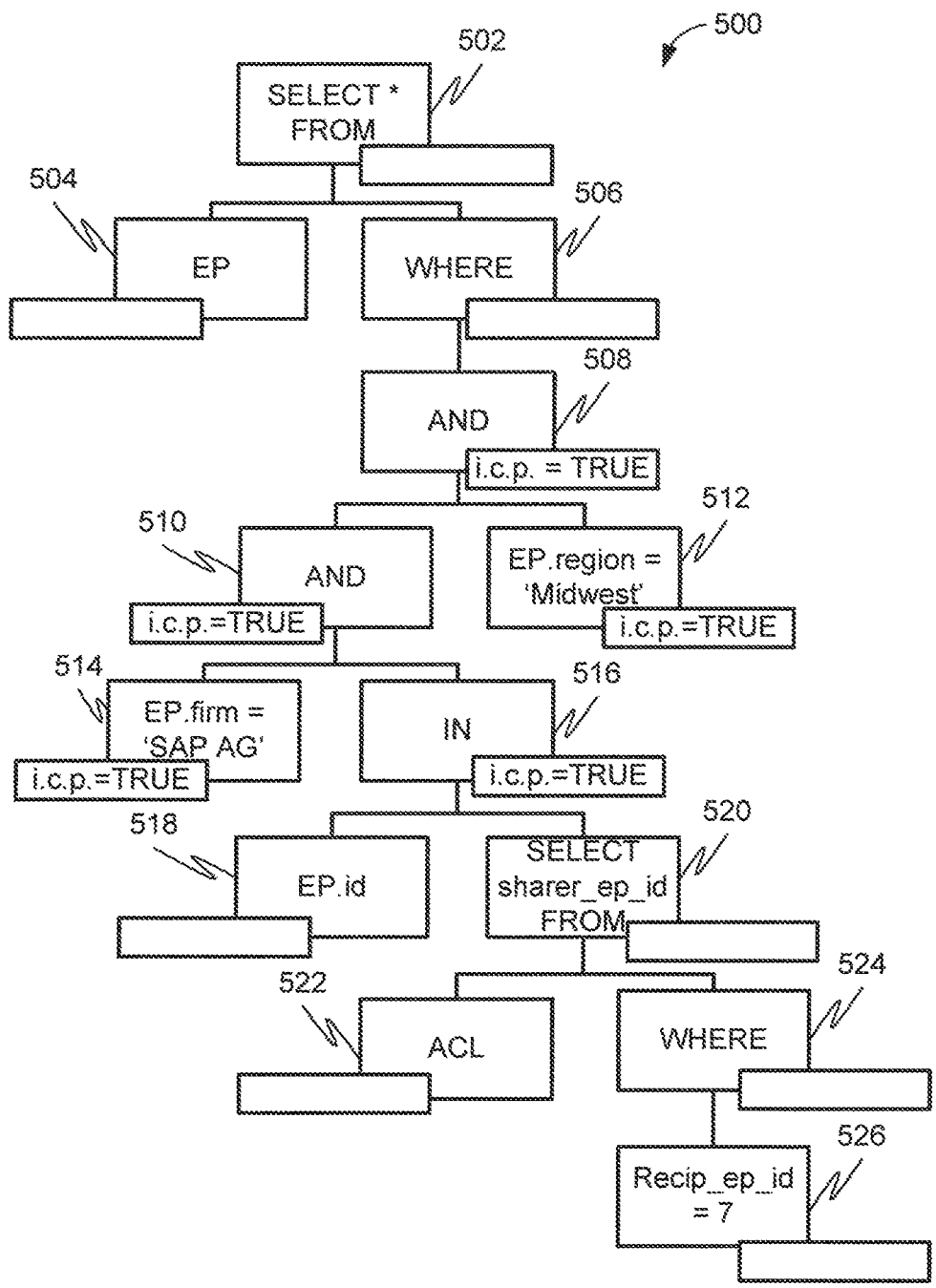

FIG. 5D illustrates the abstract syntax tree, in accordance with an example embodiment, after a third level has been labeled. Here, both EP.firm='SAP AG' node 514 and IN node 516 are labeled as being in conjunct positions because their parent node is an AND node 510. All remaining nodes 518-526 are unlabeled because their respective parent nodes are neither OR nor AND nodes.

Figure 5E:
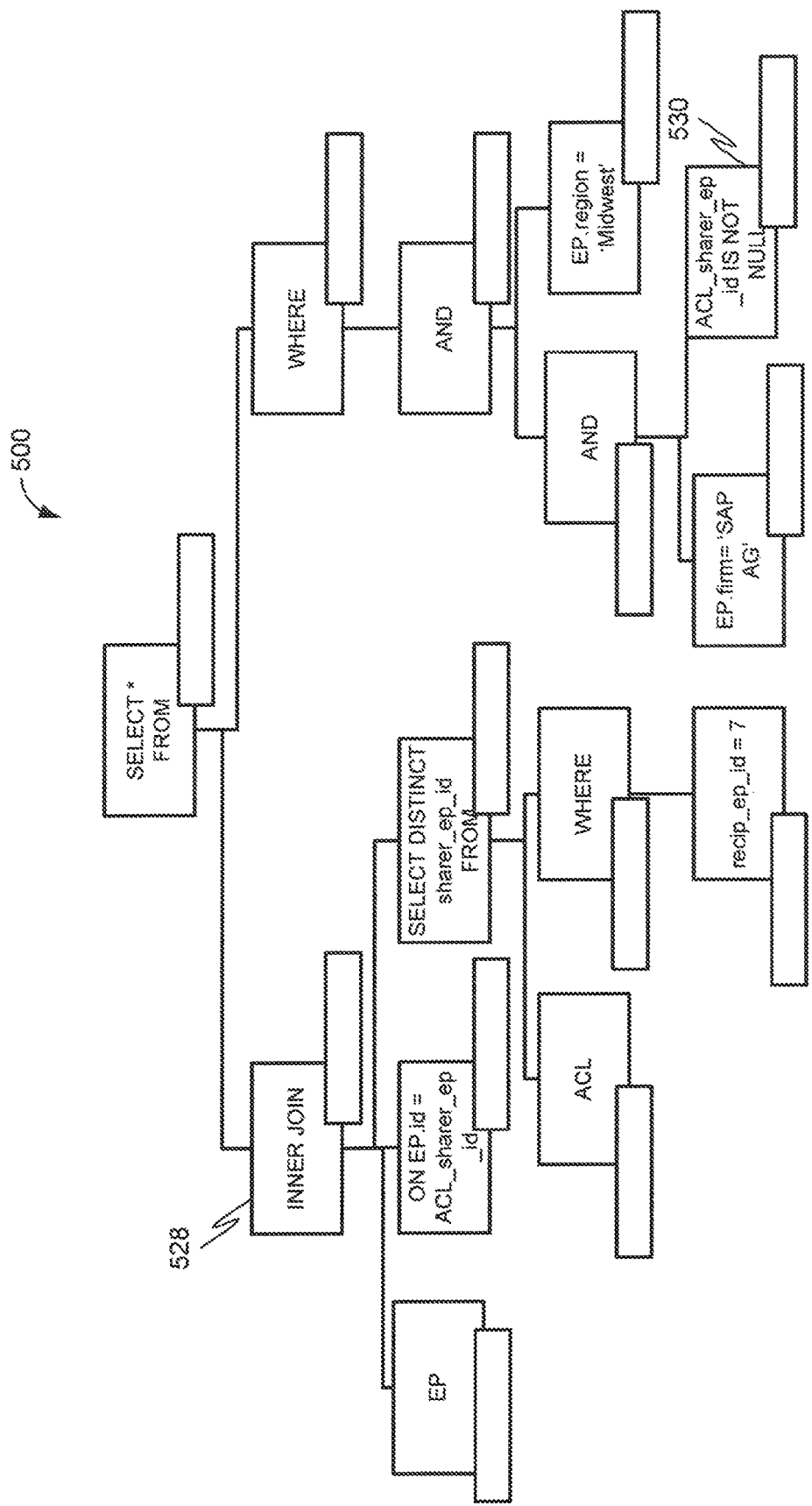

At this point, any IN node is transformed to a join node. The type of join node is dependent on whether the IN node is in a conjunct position or not. In this example, the IN node 516 is shown as being in a conjunct position. As such, an inner join is used rather than left outer join is used (e.g., optimization occurs). FIG. 5E illustrates a modified abstract syntax tree, in accordance with an example embodiment. As can be seen, INNER JOIN node 528 has been added, as well as an TRUE node 530 and the abstract tree 500 has been rearranged.

The modified abstract syntax tree 500 can then be converted into SQL. The resultant SQL query may represented as:

```
SELECT *
FROM EP INNER JOIN
    (SELECT DISTINCT sharer_ep_id FROM ACL WHERE
    recip_ep_id = 7)
    ON EP.id = ACL.sharer_ep_id
WHERE (EP.firm ='SAP AG' AND
    TRUE) AND
    EP.region = 'Midwest'
```

In some example embodiments, further optimization may then occur. For example, the TRUE node 530 may be eliminated from the WHERE expression as being redundant, resulting in the following SQL query:

```
SELECT *
FROM EP INNER JOIN
    (SELECT DISTINCT sharer_ep_id FROM ACL WHERE
    recip_ep_id = 7)
    ON EP.id = ACL.sharer_ep_id
WHERE EP.firm ='SAP AG' AND
    EP.region = 'Midwest'
```

Figure 6:
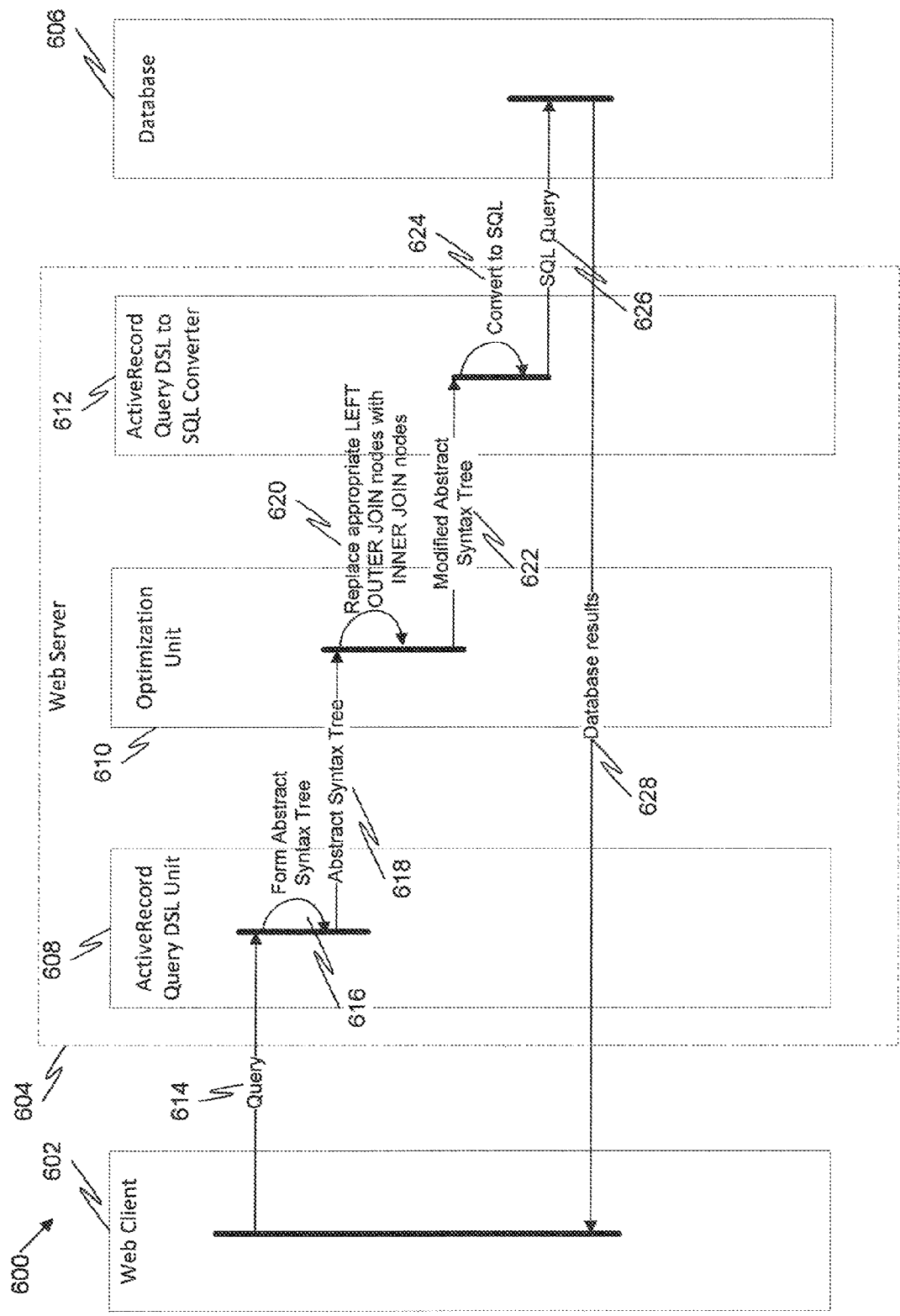
FIG. 6 is an interaction diagram illustrating a method, in accordance with an example embodiment, to perform the transformation of a query.

FIG. 6 is an interaction diagram illustrating a method, in accordance with some example embodiments, to perform the transformation of a query. The method 600 utilizes various components, including a web client 602, a web server 604, and a database 606. The web server 604 may include an ActiveRecord Query DSL unit 608, an optimization unit 610, and an ActiveRecord Query DSL to SQL converter 612.

At 614, a query, or information to define a query, is sent from the web client 602 to the web server 604. At 616, the ActiveRecord Query DSL unit 608 forms an abstract syntax tree from the query. At 618, the abstract syntax tree is forwarded to the optimization unit 610. At 620, appropriate LEFT OUTER JOIN nodes in the abstract syntax tree are replaced with INNER JOIN nodes, creating a modified abstract syntax tree. At 622, the modified abstract syntax tree is sent to the ActiveRecord Query DSL to SQL converter 612. At 624, the modified abstract syntax tree is converted to a SQL query, which at 626 is issued to the database 606. Database results from this SQL query are then sent to the web client 602 (perhaps through the web server 604) at 628.

Figure 7:
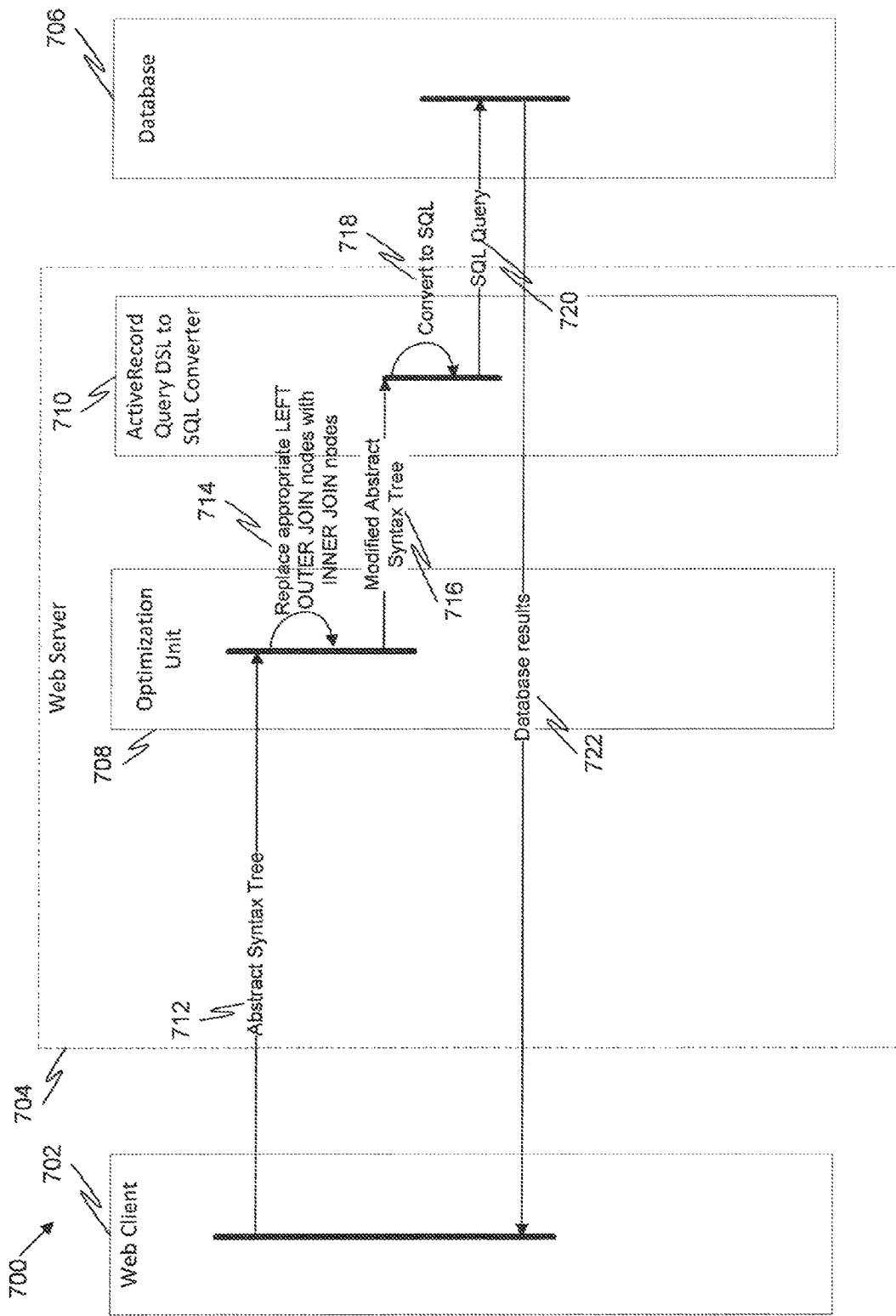
FIG. 7 is an interaction diagram illustrating a method, in accordance with another example embodiment, to perform the transformation of a query.

FIG. 7 is an interaction diagram illustrating a method, in accordance with another example embodiment, to perform the transformation of a query. The method 700 utilizes various components, including a web client 702, a web server 704, and a database 706. The web server 704 may include an optimization unit 708, and an ActiveRecord Query DSL to SQL converter 710.

At 712, a query is sent from the web client 702 to the web server 704. This query is in the form of, or includes, an abstract syntax tree. At 714, appropriate LEFT OUTER JOIN nodes in the abstract syntax tree are replaced with INNER JOIN nodes, creating a modified abstract syntax tree. At 716, the modified abstract syntax tree is sent to the ActiveRecord Query DSL to SQL converter 710. At 718, the modified abstract syntax tree is converted to a SQL query, which at 720 is issued to the database 706. Database results from this SQL query are then sent to the web client 702 (perhaps through the web server 704) at 722.

Figure 8:
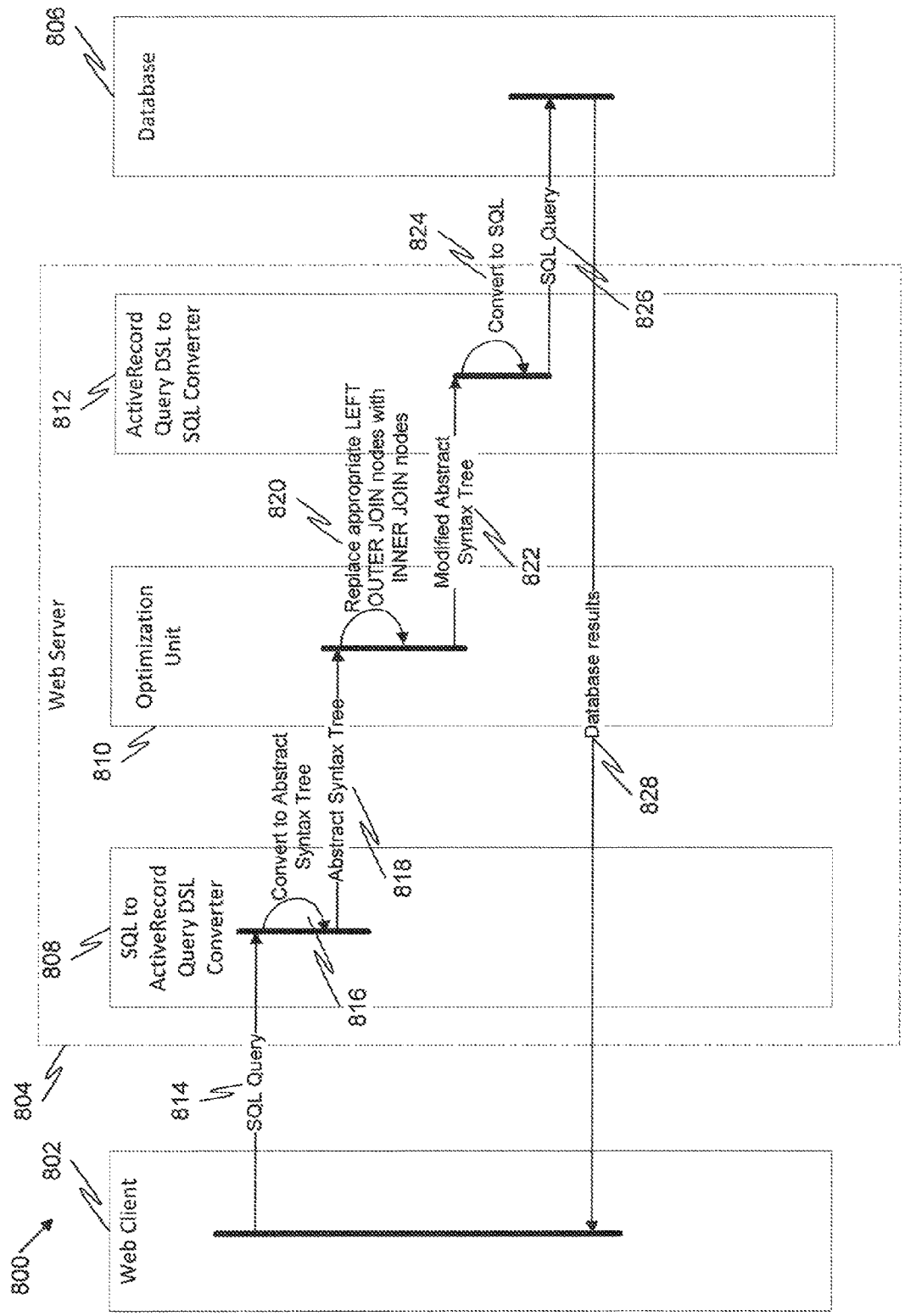
FIG. 8 is an interaction diagram illustrating a method, in accordance with another example embodiment, to perform the transformation of a query.

FIG. 8 is an interaction diagram illustrating a method, in accordance with another example embodiment, to perform the transformation of a query. The method 800 utilizes various components, including a web client 802, a web server 804, and a database 808. The web server 804 may include a SQL to ActiveRecord Query DSL converter 808, an optimization unit 810, and an ActiveRecord Query DSL to SQL converter 812.

At 814, a query is sent from the web client 802 to the web server 804. This query may be in the form of a SQL query. At 816, the SQL to ActiveRecord Query DSL converter 808 converts the SQL query into an abstract syntax tree. At 818, the abstract syntax tree is forwarded to the optimization unit 810. At 820, appropriate LEFT OUTER JOIN nodes in the abstract syntax tree are replaced with INNER JOIN nodes, creating a modified abstract syntax tree. At 822, the modified abstract syntax tree is sent to the ActiveRecord Query DSL to SQL converter 812. At 824, the modified abstract syntax tree is converted to a SQL query, which at 826 is issued to the database 806. Database results from this SQL query are then sent to the web client 802 (perhaps through the web server 804) at 828.

Figure 9:
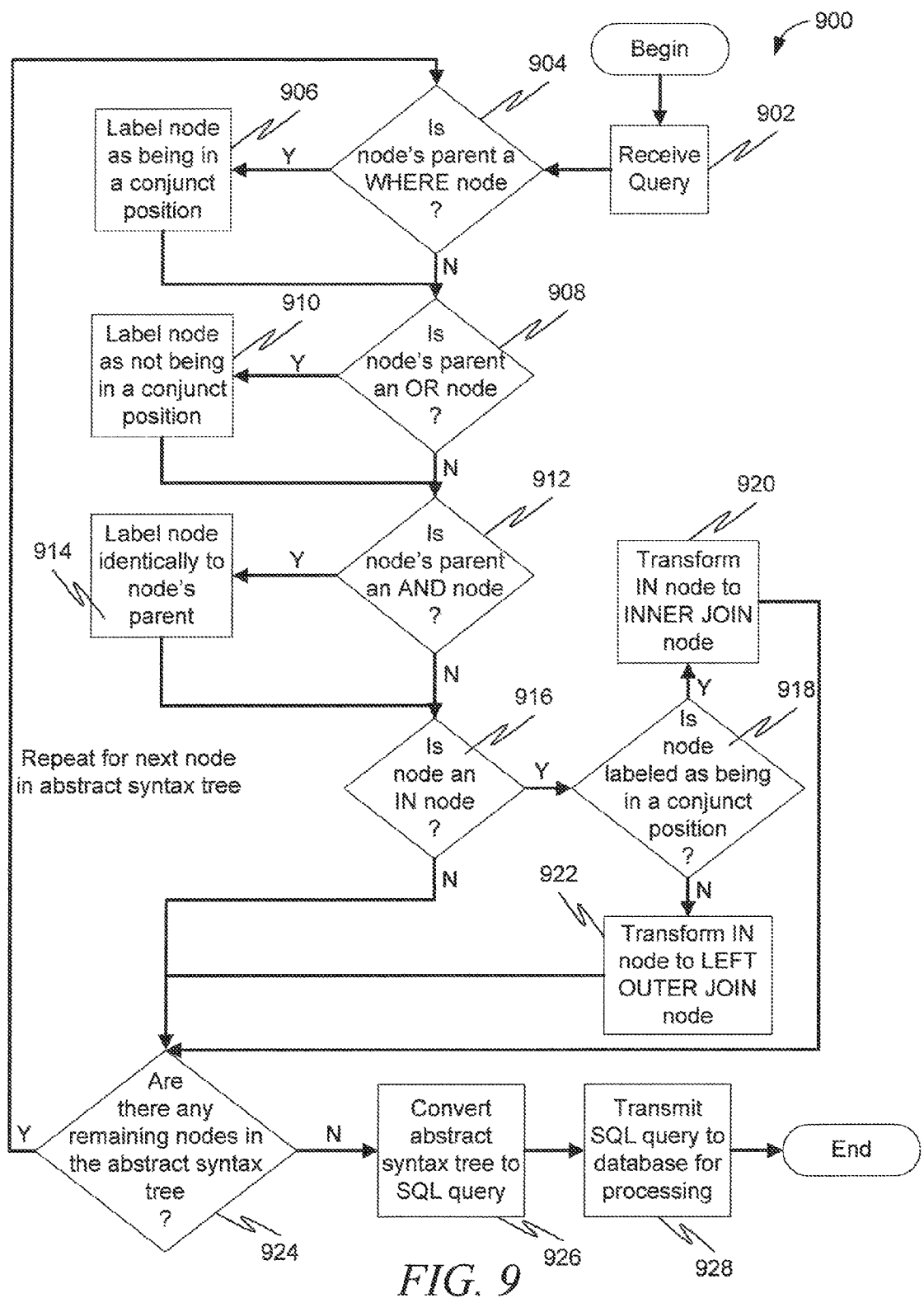
FIG. 9 is a flow diagram illustrating a method, in accordance with an example embodiment, of transforming a query at a web server.

FIG. 9 is a flow diagram illustrating a method 900, in accordance with an example embodiment, of transforming a query at a web server. At 902, a query is received. This query may either be in the form of an abstract syntax tree, or an abstract syntax tree may be generated for the query, 904-924 represent a loop repeated for each node in the abstract syntax tree, beginning with a first node in the abstract syntax tree. At 904, it is determined if the node's parent is a WHERE node. If so, then at 906 the node is labeled as being in a conjunct position. At 908, it is determined if the node's parent is an OR node. If so, then at 910 the node is labeled as not being in a conjunct position. At 912, it is determined if the node's parent is an AND node. If so, then at 914 the node is labeled identically as the node's parent. At 916, it is determined if the node is an IN node. If so, then at 918 it is determined if the node is labeled as being in a conjunct position. If so, then at 920 the IN node is transformed to an INNER JOIN node. If not, then at 922 the IN node is transformed to a LEFT OUTER JOIN node.

At 924, it is determined if there are any remaining nodes in the abstract syntax tree. If so, then the process loops back to 904 for the next node. If not, then at 926, the abstract syntax tree is converted into a SQL query. At 928, the SQL query is transmitted to a database for processing.

Figure 10:
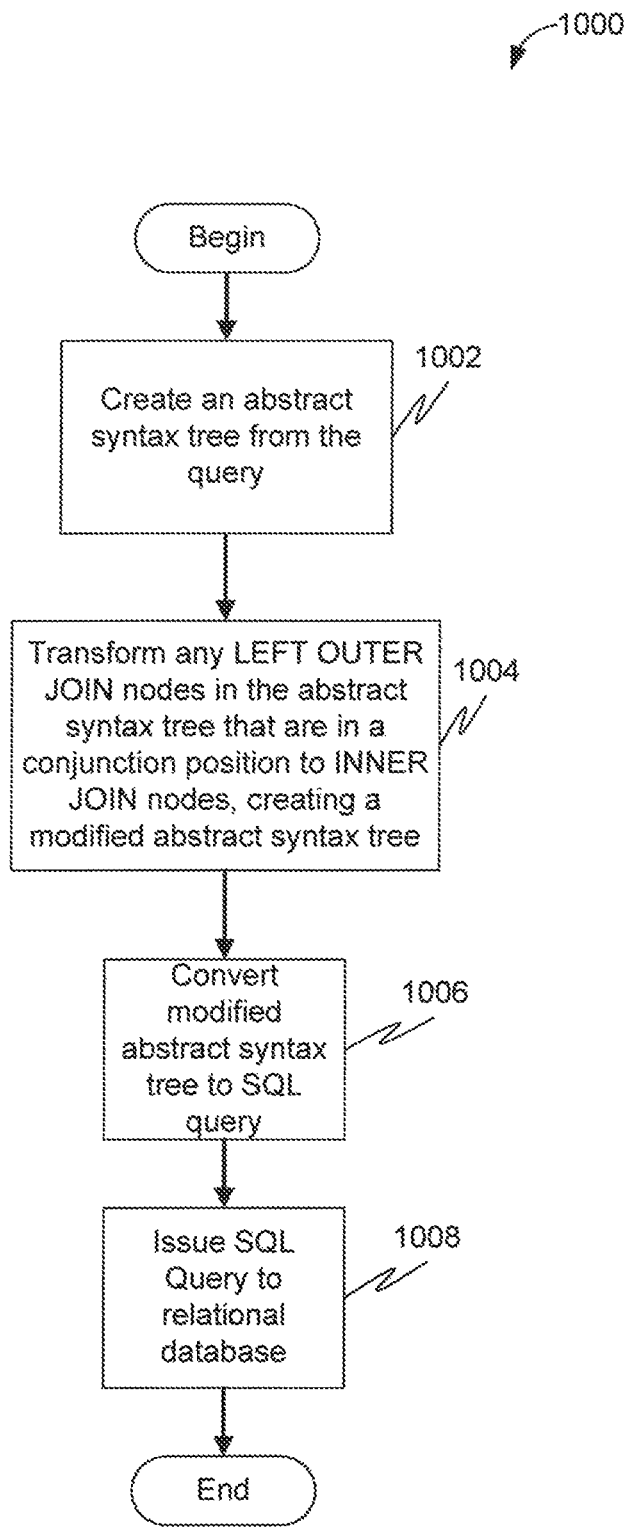
FIG. 10 is a flow diagram illustrating a method, in accordance with another example embodiment, of transforming a query at a web server.

FIG. 10 is a flow diagram illustrating a method 1000, in accordance with another example embodiment, of transforming a query at a web server. At 1002, an abstract syntax tree is created from the query. At 1004, any LEFT OUTER JOIN nodes in the abstract syntax tree that are in a conjunct position are transformed to INNER JOIN nodes, creating a modified abstract syntax tree. At 1006, the modified abstract syntax tree is converted to a SQL query. At 1008, the SQL query is issued to a relational database.

Figure 11:
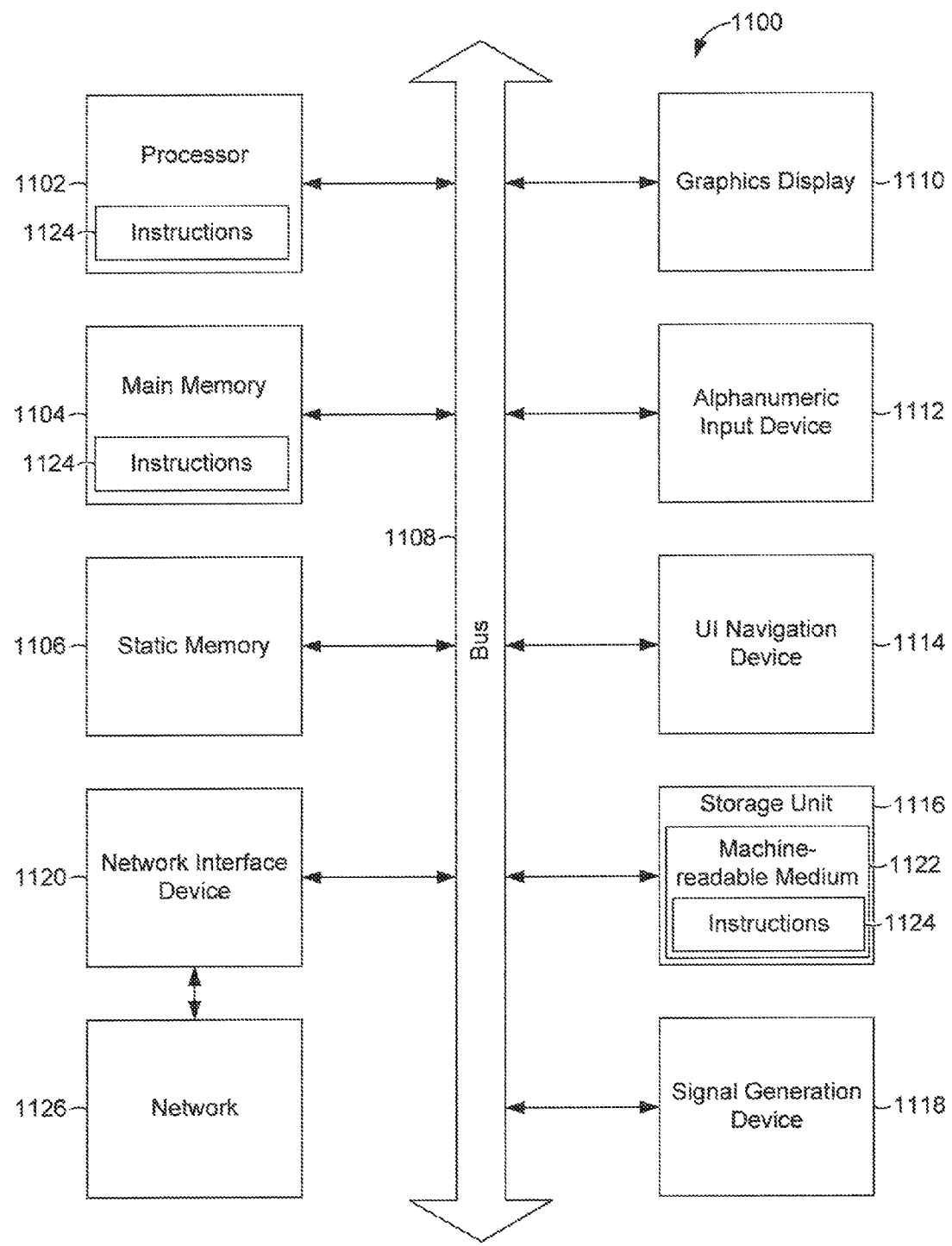
FIG. 11 is a block diagram of a computer processing system at a server system, within which a set of instructions for causing the computer to perform any one or more of the methodologies discussed herein may be executed.

FIG. 11 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a Set-Top Box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1100 includes processor 1102 (e.g., a Central Processing Unit (CPU), a Graphics Processing Unit (GPU) or both), main memory 1104 and static memory 1106, which communicate with each other via bus 1108. The processing system 1100 may further include graphics display 1110 (e.g., a plasma display, a Liquid Crystal Display (LCD) or a Cathode Ray Tube (CRT)). The processing system 1100 also includes alphanumeric input device 1112 (e.g., a keyboard), a User Interface (UI) navigation device 1114 (e.g., a mouse, touch screen, or the like), a storage unit 1116, a signal generation device 1118 (e.g., a speaker), and a network interface device 1120.

The storage unit 1116 includes machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the processing system 1100, with the main memory 1104 and the processor 1102 also constituting computer-readable, tangible media.

The instructions 1124 may further be transmitted or received over network 1126 via a network interface device 1120 utilizing any one of a number of well-known transfer protocols (e.g., HTTP).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of transforming a query at a web server, the method comprising:
    traversing, at the web server, an abstract syntax tree representing the query, for each node in the abstract syntax tree:
        setting a conjunct position field in a data structure corresponding to the node as true when the node's parent is a WHERE node;
        setting a conjunct position field in a data structure corresponding to the node as false when the node's parent is an OR node;
        setting a conjunct position field in a data structure corresponding to the node as identical to a conjunct position field in a data structure corresponding to the node's parent node when the node's parent is an AND node;
    transforming any IN node in the abstract syntax tree to an INNER JOIN node when the conjunct position field in the data structure corresponding to the IN node is set as true;
    converting the abstract syntax tree into a Structured Query Language (SQL) query; and
    transmitting the SQL query to a database for processing.

2. The method of claim 1, further comprising:
    receiving the query from a web client;
    transforming the query into an ActiveRecord query domain specific language abstract syntax tree; and
    the converting including converting an ActiveRecord query domain specific language abstract syntax tree into the SQL query.

3. The method of claim 1, further comprising:
    receiving the query at the web server as a SQL input query; and
    converting the SQL input query to the abstract syntax tree.

4. The method of claim 1, further comprising:
    transforming any IN node in the abstract syntax tree to a LEFT OUTER JOIN node when the IN node is labeled as not being in a conjunct position.

5. The method of claim 1, further comprising joining a table that is a subject of the query with an access control list table, creating an IN node in the abstract syntax tree.

6. The method of claim 5, wherein the joining is performed during the traversing.

7. The method of claim 5, wherein the joining is performed prior to the traversing an abstract syntax tree representing the query.

8. A web server comprising:
    a processor;
    memory;
    a optimization unit configured to:
        traverse an abstract syntax tree representing the query, for each node in the abstract syntax tree:
            setting a conjunct position field in a data structure corresponding to the node as true when the node's parent is a WHERE node;
            setting a conjunct position field in a data structure corresponding to the node as false when the node's parent is an OR node;

setting a conjunct position field in a data structure corresponding to the node as identical to a conjunct position field in a data structure corresponding to the node's parent node when the node's parent is an AND node; and transform an IN node in the abstract syntax tree to an INNER JOIN node when the conjunct position field in the data structure corresponding to the IN node is set as true; and transform an IN node in the abstract syntax tree to a LEFT OUTER JOIN node when the conjunct position field in the data structure corresponding to the IN node is set as false; and an abstract syntax tree to SQL converter configured to convert the abstract syntax tree into a SQL query and to transmit the SQL query to a database for processing.

9. The web server of claim 8, further comprising:

an ActiveRecord Query domain specific language unit configured to transform the query into an ActiveRecord query domain specific language abstract syntax tree.

10. The web server of claim 9, further comprising a user controller class, a user class, an activity controller class, an activity class, an item controller class, and an item class.

11. The web server of claim 8, further comprising:

a SQL query to abstract syntax tree converter configured to convert an SQL input query to the abstract syntax tree.

12. The web server of claim 8, further comprising an access control unit configured to join a table that is a subject of the query with an access control list table, creating an IN node in the abstract syntax tree.

13. A non-transitory computer-readable storage medium comprising instructions that, when executed by at least one processor of a machine, cause the machine to perform operations of transforming a query at a web server, the method comprising:

Traversing an abstract syntax tree representing the query, for each node in the abstract syntax tree:

setting a conjunct position field in a data structure corresponding to the node as true when the node's parent is a WHERE node;

setting a conjunct position field in a data structure corresponding to the node as false when the node's parent is an OR node;

setting a conjunct position field in a data structure corresponding to the node as identical to a conjunct position field in a data structure corresponding to the node's parent node when the node's parent is an AND node;

transforming any IN node in the abstract syntax tree to an INNER JOIN node when the conjunct position field in the data structure corresponding to the IN node is set as true;

converting the abstract syntax tree into a Structured Query Language (SQL) query; and transmitting the SQL query to a database for processing.

\* \* \* \* \*